Patented Mar. 3, 1931

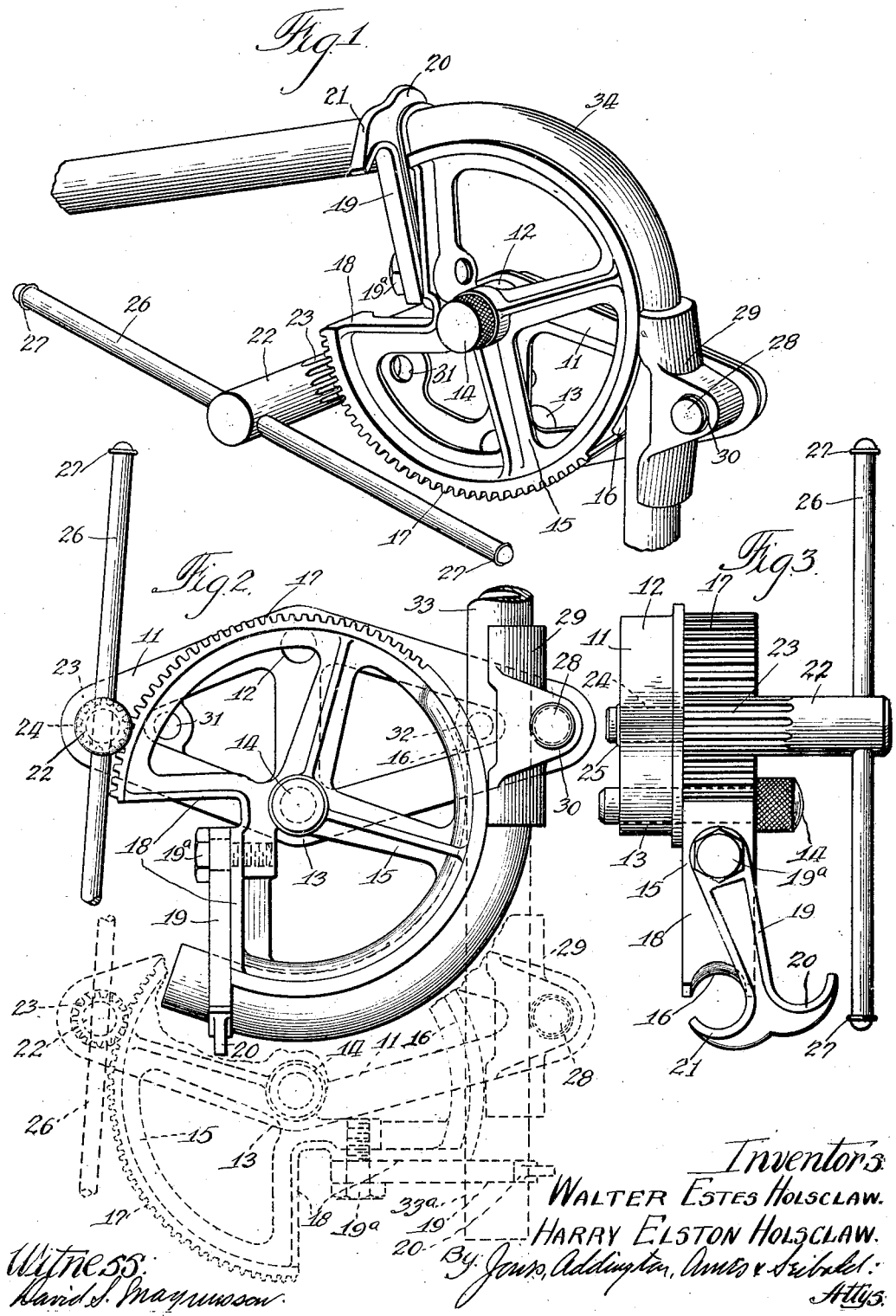

1,794,689

UNITED STATES PATENT OFFICE

WALTER ESTES HOLSCLAW AND HARRY ELSTON HOLSCLAW, OF EVANSVILLE, INDIANA

DEVICE FOR BENDING PIPE AND THE LIKE

Application filed January 14, 1930. Serial No. 420,770.

This invention relates to devices for bending pipes and the like and has particular relation to devices of this character which are adapted for portable use as well as for mounting on benches and other fixed supports for stationary use.

The present invention is an improvement over the device of our prior Patent No. 1,687,210, dated October 9, 1928.

One object of the invention is to provide a device of the above-indicated character that shall be suitable for bending pipes, tubes and the like during the actual installation of the same. For example, in installing refrigerating systems using brass or copper tubing it is desirable to form the required bends in the piping as the installation progresses, rather than to form the pipe sections in a shop or at a work-bench and then install such sections after the bends have been made. This is one example of the type of use to which the present invention is especially adapted.

Another object of the invention is to provide a device of the above-indicated character that may be readily adjusted for making bends in pipes and the like in any desired direction, such as right-hand and left-hand bends of any particular installation, and bends of any desired character where the working space is limited; and to construct the device so that it may be readily removed from the work after use.

Another object of the invention is to provide a device for bending pipes and the like embodying means for insuring the removal of "kinks" or other irregularities in the pipes or tubes which are being bent.

A further object of the invention is to provide a device of the above-indicated character which shall be rugged in its construction and reliable in operation without being cumbersome to handle when being used as a portable device.

Other objects and advantages of the invention will appear from a consideration of the following detailed description in conjunction with the accompanying drawings, in which:

Figure 1 is a perspective view of a device embodying the invention, showing the same applied to a pipe or tube in which a bend has been made by the operation of the device;

Fig. 2 is a front elevational view showing the device in similar relation to a pipe or tube which has been bent thereby, to that illustrated in Fig. 1, but with certain parts of the device adjusted in a different manner, so that a bend may be made in a different direction; this figure also showing in dotted lines the position of the pipe section before it is bent, and the corresponding positions of the various parts of the bending device; and Fig. 3 is a side elevational view of the bending device shown in Figs. 1 and 2, corresponding to a view looking at the left end of the device, as shown in full lines in Fig. 2, but with the showing of the pipe omitted.

Referring to the drawings, the preferred embodiment of the invention comprises a frame member 11 which is of substantially diamond shape and constructed in a web formation for the purpose of securing the maximum strength and rigidity with the minimum weight. The frame 11 comprises two journal portions 12 and 13 which are bored to receive in freely sliding relation a pin 14. The head of the pin 14 is preferably knurled, as shown, to facilitate its insertion and removal in the desired one of the two journal portions 12 and 13 of the frame 11. A wheel 15 of mutilated formation is bored through its hub to receive the shank of the pin 14 in freely fitting relation, so that said wheel may be pivotally mounted on either of two axes, which are the axes of the journal portions 12 and 13 of the frame member.

The wheel 15 is formed with a groove 16 of substantially semicircular cross-section which extends around a portion of the periphery of the wheel. Another portion of the periphery of said wheel is provided with gear teeth 17 which extend from a point near one end of the groove 16 around to a section 18 of the wheel which is mutilated by cutting out a portion approximately constituting a sector of the wheel. The groove 16 extends from the above-mentioned point adjacent the starting point of the gear teeth 17 around to the other edge of the mutilated portion 18. The wheel 15 is of spoke formation and a double-pronged hook 19 is pivotally mounted on a bolt or screw 19a carried by the spoke determining one edge of the mutilated portion 18. The prongs 20 and 21 of the hook 19 project in opposite directions from the outer end of said hook and are respectively adapted to grasp the pipe or tube to be bent, with the other of said hooks projecting out on the other side of the wheel 15.

A spindle 22 is formed with gear teeth 23 constituting a pinion with its teeth adapted to intermesh with the gear teeth 17 on the wheel 15. This spindle 22 has a reduced diameter shank 24 which is journaled in a suitable bore in the frame member 11 and which may be grooved to receive a retaining wire or ring 25 on the inner surface of said frame member when the parts of the device are assembled. The forward portion of the spindle 22 projects forwardly a substantial distance from the plane of the front surface of the wheel 15 and is bored transversely to receive a handle member 26 whereby the spindle 22 may be readily turned. In order to facilitate the use of the device where the working space is limited it is preferable to have the handle 26 freely slidable through the transverse bore in the spindle 22. For the purpose of preventing the handle 26 from dropping out of position, the ends thereof are enlarged or provided with retaining wires or rings 27.

The journal portions 12 and 13 define two corners of the frame member 11, and the journal portion for the spindle 22 is located equidistant from the portions 12 and 13, so that the pinion portion 23 may cooperate with the gear teeth 17 on the wheel 15 in either position of the latter, depending upon which of the two journal portions 12 and 13 carries the wheel-supporting pin 14. The fourth corner of the frame member 11 carries a stud 28 which is also located equidistant from the journal portions 12 and 13, and upon this stud a shoe 29 is pivotally mounted. The inner surface of the shoe 29 is formed with a groove of substantially semicircular cross-section which is complementary to the groove 16 in the wheel 15, and the length of the shoe 29 is such that one or the other of its ends lies in substantially tangential relation to the wheel 15, depending upon which of the two journal portions 12 and 13 carries the pivot pin 14 for said wheel.

In the position shown in Fig. 1 the pin 14 carrying the wheel 15 is inserted in the journal portion 12 at the upper corner of the frame member 11, and, accordingly, the upper end of the shoe 29 is adapted to lie in tangential relation to the wheel 15. In Fig. 2 the pin 14 is shown located in the journal portion 13 at the bottom of the frame member 11, so that the lower end of the shoe 29 is adapted to lie in tangential relation to the wheel 15. In order that the device may be adjusted for either of these conditions the pin 14 is readily removable by the operator who may grasp the same by its knurled forward extremity and remove it from and insert it in either of the journal portions 12 and 13, as desired. The shoe 29, however, is always carried by the stud 28, and accidental displacement thereof from said stud is prevented by a retaining wire or ring 30 which may be conveniently carried in a peripheral groove at the forward extremity of the said stud.

The web portion of the frame member 11 is provided with holes 31 and 32 near the respective ends of said frame member, and these holes are adapted to receive bolts or screws for securing the device to a bench or other support where it is to be used as a stationary machine. As heretofore stated, however, an important feature of the invention is the construction of the device whereby it is adapted for portable use. The operation of the device for both portable and stationary use will now be described.

Fig. 2 shows a pipe or tube 33, the lower portion 33a of which indicates in dotted lines the vertical position of the pipe section before it has been bent to the position indicated in full lines. Assuming that this vertically depending pipe section 33 is held stationary, as by being fastened in position in an installation, and that it is desired to bend the lower extremity of said pipe section to the position shown in full lines, the bending device is applied as shown in dotted lines. This application is made by sliding the device upwardly over the lower end 33a of the pipe, so that the pipe extends through the substantially circular opening between the wheel 15 and the shoe 29, which opening is formed by the complementary grooves in said members.

The hook 19 is so positioned in applying the device that the pipe end 33a extends under the prong 21, which is the rear one of the two prongs when the pivot pin 14 for the wheel 15 is located in the journal portion 13 of the frame 11. The relative positions of the parts are such that the hook 19 then lies relatively close to the lower end of the shoe 29, while the pinion 23 intermeshes with the gear teeth 17 on the periphery of the wheel 15 near the inner end of the groove 16.

When the device is positioned in this manner the desired bend in the lower portion of the pipe section 33 is formed by rotating the pinion 23 in a counterclockwise direction by manipulation of the handle 26. This operation causes the wheel 15 to be turned in a clockwise direction whereby the grooved portion 16 thereof rolls upwardly along the vertical pipe section. When the wheel 15 is rotated in this manner the lower end of the pipe section is bent around until it occupies the position indicated in full lines in Fig. 2, and during this operation the shoe 29 slides upwardly along the straight section of the pipe to the position also indicated in full lines. Since the shoe 29 is fixed against any movement except pivotal movement with respect to the frame member 11, this frame member also moves upwardly with respect to the pipe section 33, and at all times maintains its position with its longer axis at substantially right angles to the straight section of the pipe 33. As the pipe slides through the shoe 29 it is pressed firmly against the outer end of the same, so that any "kinks" or other irregularities in the pipe are eliminated by the corresponding pressure automatically applied thereto by the inner end of the shoe, that is, the end adjacent the wheel 15. This action may be accentuated, if desired, by manually forcing the inner end of the shoe 29 (the lower end as viewed in Fig. 2) more firmly against the pipe 33 by means of any suitable implement or handle, but the pressure which is automatically applied by reason of the bending of the pipe is sufficient to accomplish the desired result in all ordinary cases. It is primarily for this reason that the shoe 29 is pivotally mounted, for we have found that this construction, which utilizes the forces produced in bending the pipe for automatically forcing the shoe toward the periphery of the wheel 15, gives better results than are obtained with a fixed shoe.

When the bend of the desired degree has been made in the pipe, the device is removed therefrom by simply giving a reverse twist to the handle 26 to free the parts, and sliding the hook 19 and the shoe 29 off the free end of the pipe. The location of the pivots 12 and 13 off center with respect to the pinion 23 and shoe 29 is most advantageous, because the binding of the parts on the pipe is immediately released when the rotation of the pinion 23 is reversed. Removal of the device may be further facilitated, if desired, by removing the pin 14, thus permitting bodily movement of the wheel 15 from the shoe 29.

When it is desired to make a bend of the nature indicated in the pipe 34 in Fig. 1, the pivot pin 14 is removed from the journal portion 13 of the frame 11 and the wheel 15 (assuming the parts to be assembled in the manner shown in Fig. 2), and said wheel is turned over and its opposite face placed against the front of the frame member 11. The pin 14 is then inserted through the bore in the hub of the wheel 15 and into the journal portion 12 of the frame member. This places the parts in position to start the bending of the pipe 34 with the pinion 23 near the inner end of the series of gear teeth 17, in the same manner that these parts are positioned as shown in dotted lines in Fig. 2. The relative positions of the parts are inverted, however, so that a clockwise rotation is imparted to the pinion 23 to cause the opposite type of bend to be made in the pipe 34.

The construction of the device whereby the wheel 15 simply turned over and located on its opposite pivotal axis in the manner described, is of great importance where the pipe to be bent is not readily accessible and the working space is limited. It is for the purpose of accommodating the operation of the device in either of the two conditions described that the hook 19 is provided with the two prongs 20 and 21. It will be seen that in the relation illustrated in Fig. 1 the hook 20 is at the rear, while in Fig. 2 the hook 21 is at the rear. Since it is desirable to have the hook attached by moving it inwardly from the front of the device, this construction is most advantageous and eliminates interference between the hook and the frame member 11 during the rotation of the wheel 15.

The device may also be used, if desired, by utilizing the shoe 29 to grasp the free extremity of the pipe to be bent, and rotating the handle 26 in the same manner as before. With this mode of operation the wheel 15 will remain stationary while the frame member 11 will rotate about the pivot pin 14 due to the stepping of the pinion 23 along the gear teeth 17. The shoe 29 will then remain in firm engagement with the free extremity of the pipe, and the latter will be drawn through the prong 20 or 21 of the hook 19 and the groove 16 of the wheel 15. This alternative mode of operation may be desirable under certain conditions of operation, due to inaccessibility of the pipe, limitations of space, or other factors.

When the device is secured to a bench or other fixed support for stationary use, the method of operation is substantially the same as that described above. In this case, of course, the pipe sections will not be held stationary, and the portion to be bent will simply be inserted between the shoe 29 and the grooved portion of the wheel 15 and under the rear prong of the hook 19. As the handle 26 is then rotated, the pipe section will be fed in and wrapped around the wheel until the bend of the desired degree has been made.

While only one specific modification of the invention has been illustrated and described herein, it will be apparent to those skilled in the art that various changes and modifications in the details of construction and arrangement of parts may be made without departing from the spirit and scope of the invention. For example, different types of gearing or other operative connections may be utilized between the handle and the wheel 15, and, if desired, the pinion 23 may be pivotally mounted on the wheel and arranged to engage teeth formed on the frame member. The grooved and geared portions of the wheel may be made separate and suitably secured together, rather than being made integral. The shoe 29 may be provided with or replaced by rollers, and other forms of locking devices instead of the hook 19 may be utilized. All of these modifications and many others too numerous to mention are contemplated and included within the scope of the present invention.

The invention having been thus illustrated and described, what is claimed as new and is desired to secure by Letters Patent is:

1. A device of the character described, comprising a frame member, a wheel having a peripheral groove therein for forming the desired bend in pipes or the like, means for securing a pipe or the like to be bent in desired relation to said wheel, means for pivotally mounting said wheel in either of two positions on said frame member, means for effecting relative rotation between said frame member and said wheel in either position of the latter, and a shoe pivotally mounted on said frame member to cooperate with said wheel in either position of the latter in causing the desired bends to be made.

2. A device of the character described, comprising a frame member, a wheel having a peripheral groove of substantially semicircular cross-section therein for forming the desired bend in pipes or the like, means for securing a pipe or the like to be bent in desired relation to said wheel, means for pivotally mounting said wheel in either of two positions on said frame member, means for effecting relative rotation between said frame member and said wheel in either position of the latter, and a shoe pivotally mounted on said frame member to cooperate with said wheel in either position of the latter in causing the desired bends to be made, said shoe having a groove of substantially semi-circular cross-section therein complementary to the groove in said wheel and being mounted in such position that one or the other of its ends lies in substantially tangential relation to said wheel during the operation of the device, depending upon which position is occupied by said wheel.

3. A device of the character described, comprising a frame member, a wheel having a peripheral groove therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, and securing means mounted on said wheel to hold a pipe or the like to be bent in desired relation to said wheel.

4. A device of the character described, comprising a frame member, a wheel having a peripheral groove therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, and a double-pronged hook mounted on said wheel and adapted to hold a pipe or the like to be bent in desired relation to said wheel with one or the other of its two prongs, depending upon which position is occupied by said wheel.

5. A device of the character described, comprising a frame member, a wheel having a peripheral groove of substantially semicircular cross-section therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, said shoe having a groove of substantially semicircular cross-section therein complementary to the groove in said wheel and being mounted in such position that one or the other of its ends lies in substantially tangential relation to said wheel during the operation of the device, depending upon which position is occupied by said wheel, and securing means mounted on said wheel to hold a pipe or the like to be bent in desired relation to said wheel.

6. A device of the character described, comprising a frame member, a wheel having a peripheral groove of substantially semicircular cross-section therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, said shoe having a groove of substantially semicircular cross-section therein complementary to the groove in said wheel and being mounted in such position that one or the other of its ends lies in substantially tangential relation to said wheel during the operation of the device, depending upon which position is occupied by said wheel, and a double-pronged hook mounted on said wheel and adapted to hold a pipe or the like to be bent in desired relation to said wheel with one or the other of its two prongs, depending upon which position is occupied by said wheel.

7. A device of the character described, comprising a frame member, a mutilated wheel having a peripheral groove therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, and securing means pivotally mounted on the mutilated portion of said wheel to hold a pipe or the like to be bent in desired relation to said wheel.

8. A device of the character described, comprising a frame member, a mutilated wheel having a peripheral groove therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, and a double-pronged hook pivotally mounted on the mutilated portion of said wheel and adapted to hold a pipe or the like to be bent in desired relation to said wheel with one or the other of its two prongs, depending upon which position is occupied by said wheel.

9. A device of the character described, comprising a frame member, a mutilated wheel having a peripheral groove of substantially semicircular cross-section therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, said shoe having a groove of substantially semicircular cross-section therein complementary to the groove in said wheel and being mounted in such position that one or the other of its ends lies in substantially tangential relation to said wheel during the operation of the device, depending upon which position is occupied by said wheel, and securing means pivotally mounted on the mutilated portion of said wheel to hold a pipe or the like to be bent in desired relation to said wheel.

10. A device of the character described, comprising a frame member, a mutilated wheel having a peripheral groove of substantially semicircular cross-section therein for forming the desired bend in pipes or the like, means for pivotally mounting said wheel in either of two positions on said frame member, means for effecting relative rotation between said frame member and said wheel in either position of the latter, a shoe pivotally mounted on said frame member to cooperate with said wheel in either position of the latter in causing the desired bends to be made, said shoe having a groove of substantially semicircular cross-section therein complementary to the groove in said wheel and being mounted in such position that one or the other of its ends lies in substantially tangential relation to said wheel during the operation of the device, depending upon which position is occupied by said wheel, and a double-pronged hook pivotally mounted on the mutilated portion of said wheel and adapted to hold a pipe or the like to be bent in desired relation to said wheel with one or the other of its two prongs, depending upon which position is occupied by said wheel.

11. A device of the character described, comprising a frame member, a wheel having a peripheral groove therein, means for securing a pipe or the like to be bent in desired relation to said wheel, means cooperable with said wheel for forming the desired bend in pipes or the like, means for pivotally mounting said wheel in either of two positions on said frame member, and means mounted on said frame member equidistant from the two pivotal axes of said wheel for effecting relative rotation between said frame member and said wheel in either position of the latter.

12. A device of the character described, comprising a frame member, a wheel having a peripheral groove therein for forming the desired bend in pipes or the like, means for securing a pipe or the like to be bent in desired relation to said wheel, means for pivotally mounting said wheel in either of two positions on said frame member, means mounted on said frame member equidistant from the two pivotal axes of said wheel for effecting relative rotation between said frame member and said wheel in either position of the latter, and a shoe pivotally mounted on said frame member equidistant from the two pivotal axes of said wheel to cooperate with said wheel in either position of the latter in causing the desired bends to be made.

13. A device of the character described, comprising a frame member, a wheel having a peripheral groove therein and having a gear-toothed portion, means for securing a pipe or the like to be bent in desired relation to said wheel, means cooperable with said wheel for forming the desired bend in pipes or the like, means for pivotally mounting said wheel in either of two positions on said frame member, and an operating member having teeth adapted to mesh with the gear-toothed portion of said wheel and mounted on said frame member equidistant from the two pivotal axes of said wheel for effecting relative rotation between said frame member and said wheel in either position of the latter.

14. A device of the character described, comprising a frame member, a wheel having a peripheral groove therein for forming the desired bend in pipes or the like and having a gear-toothed portion, means for securing a pipe or the like to be bent in desired relation to said wheel, means for pivotally mounting said wheel in either of two positions on said frame member, an operating member having teeth adapted to mesh with the gear-toothed portion of said wheel and mounted on said frame member equidistant from the two pivotal axes of said wheel for effecting relative rotation between said frame member and said wheel in either position of the latter, and a shoe pivotally mounted on said frame member equidistant from the two pivotal axes of said wheel to cooperate with said wheel in either position of the latter in causing the desired bends to be made.

15. A device of the character described, comprising a frame member, a wheel having a groove in a portion of its periphery and having gear teeth around another portion of its periphery, means for securing a pipe or the like to be bent in desired relation to said wheel, means cooperable with said wheel for forming the desired bend in pipes or the like, means for pivotally mounting said wheel in either of two positions on said frame member, a pinion pivotally mounted on said frame member equidistant from the two pivotal axes of said wheel whereby an intermeshing engagement between said pinion and the gear teeth on said wheel is obtained in either position of the latter, and means for turning said pinion to effect relative rotation between said frame member and said wheel.

16. A device of the character described, comprising a frame member, a wheel having a groove in a portion of its periphery for forming the desired bend in pipes or the like and having gear teeth around another portion of its periphery, means for securing a pipe or the like to be bent in desired relation to said wheel, means for pivotally mounting said wheel in either of two positions on said frame member, a pinion pivotally mounted on said frame member equidistant from the two pivotal axes of said wheel whereby an intermeshing engagement between said pinion and the gear teeth on said wheel is obtained in either position of the latter, means for turning said pinion to effect relative rotation between said frame member and said wheel, and a shoe pivotally mounted on said frame member equidistant from the two pivotal axes of said wheel to cooperate with said wheel in either position of the latter in causing the desired bends to be made.

17. A device of the character described, comprising a frame member, a wheel having a peripheral groove therein for forming the desired bend in pipes or the like, means for securing a pipe or the like to be bent in desired relation to said wheel, means for pivotally mounting said wheel in either of two positions on said frame member, means for effecting relative rotation between said frame member and said wheel, and a shoe mounted on said frame member to cooperate with said wheel in either position of the latter in causing the desired bends to be made.

18. A device of the character described, comprising a frame member, a wheel having a peripheral groove of substantially semicircular cross-section therein for forming the desired bend in pipes or the like, means for securing a pipe or the like to be bent in desired relation to said wheel, means for pivotally mounting said wheel in either of two positions on said frame member, means for effecting relative rotation between said frame member and said wheel, and a shoe mounted on said frame member and having a groove of substantially semicircular cross-section therein complementary to the groove in said wheel, to cooperate with said wheel in either position of the latter in causing the desired bends to be made.

19. A device of the character described, comprising a frame member, a wheel having a groove in a portion of its periphery for forming the desired bend in pipes or the like and having gear teeth around another portion of its periphery, means for securing a pipe or the like to be bent in desired relation to said wheel, means for pivotally mounting said wheel in either of two positions on said frame member, a pinion pivotally mounted on said frame member in intermeshing engagement with the gear teeth on said wheel, means for turning said pinion to effect relative rotation between said frame member and said wheel, and a shoe mounted on said frame member to cooperate with said wheel in either position of the latter in causing the desired bends to be made.

20. A device of the character described, comprising a frame member, a wheel having a groove of substantially semicircular cross-section in a portion of its periphery for forming the desired bend in pipes or the like and having gear teeth around another portion of its periphery, means for securing a pipe or the like to be bent in desired relation to said wheel, means for pivotally mounting said wheel in either of two positions on said frame member, a pinion pivotally mounted on said frame member in intermeshing engagement with the gear teeth on said wheel, means for turning said pinion to effect relative rotation between said frame member and said wheel, and a shoe mounted on said frame member and having a groove of substantially semicircular cross-section therein complementary to the groove in said wheel, to cooperate with said wheel in either position of the latter in causing the desired bends to be made.

In witness whereof, we have hereunto subscribed our names.

WALTER ESTES HOLSCLAW.
HARRY ELSTON HOLSCLAW.